455-296 SR
FIP8106 XR 2,840,645
X5463W
X5694W
X56859
SEARCH ROOM
4
June 24, 1958 M. D. NELSON ET AL 2,840,645
TELEVISION INTERMEDIATE FREQUENCY AMPLIFIERS
Filed May 17, 1954 2 Sheets-Sheet 1
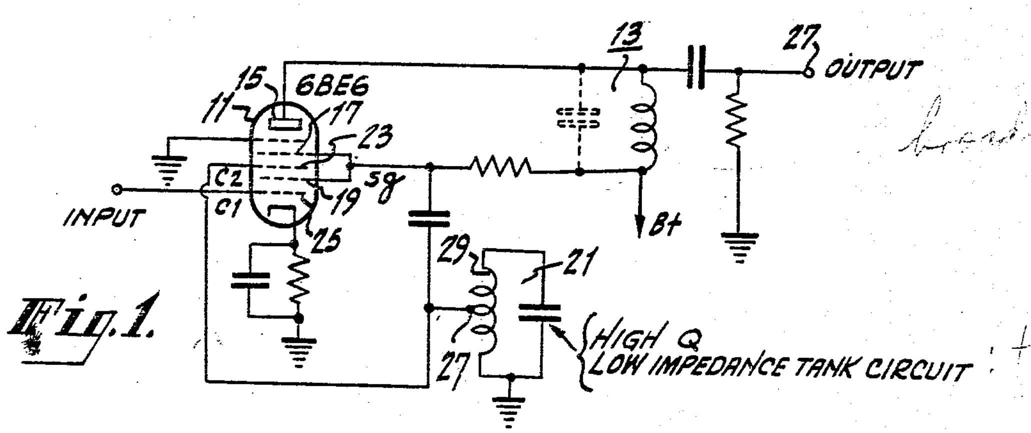
Fig. 1.
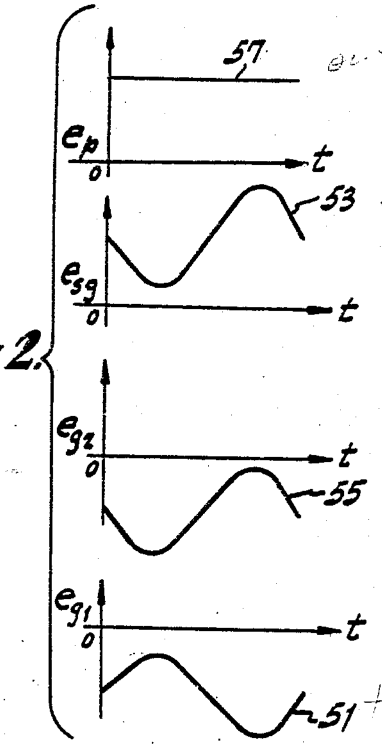
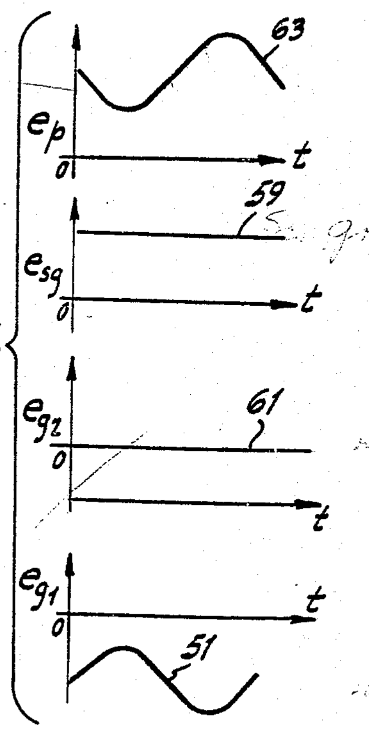
Fig. 2. Fig. 3.
INVENTORS
MORRIS D. NELSON &
BENJAMIN FISHER
BY
ATTORNEY tuned to next lower band to give cancellation as in Fig 4

INVENTORS
MORRIS D. NELSON &
BENJAMIN FISHER
BY [signature]
ATTORNEY 2,840,645
Patented June 24, 1958

2,840,645

TELEVISION INTERMEDIATE FREQUENCY AMPLIFIERS

Morris D. Nelson, New York, and Benjamin Fisher, Forest Hills, N. Y., assignors to Radio Corporation of America, a corporation of Delaware Application May 17, 1954, Serial No. 430,168

6 Claims. (Cl. 179—171)

The present invention relates to signal cancellation circuits and means for shaping the band-pass characteristics of a band-pass amplifier with particular application to color television amplifiers.

The superheterodyne receiver is virtually the standard of radio and television receivers in commercial use today. In receivers of this type, the incoming signals from the antenna are passed into a frequency mixer where they are beat against a signal from a local oscillator to form an intermediate frequency signal. This intermediate frequency signal is then passed to an intermediate frequency amplifier and then subjected to detection after which point the intelligence may be applied to a loud speaker or to an image reproducing system depending upon what type of signal is being received. The tuned circuits in I. F. amplifiers are fixed in frequency whereas for example, in regular frequency amplifiers they require tuning to the individual signal. If the receiver is to cover an extended frequency range, it is evident that the use of the superheterodyne intermediate frequency amplifier system is far superior to the use, for example, of a radio frequency amplifier system. There are other advantages of using a superheterodyne receiver. For example, it is often possible to secure a higher gain per stage at the intermediate frequencies than at radio frequency. Also, better control of frequency response can generally be achieved at intermediate frequencies, particularly if the receiver is to operate over an extended frequency range.

In the early days of radio communication, the problem of designing an intermediate frequency amplifier was far simpler than that required for design in the systems used in modern day communications which involve both radio and television. In the early days it was necessary only to accommodate a signal having a total bandwidth of approximately 10 kilocycles. With the growth of frequency modulation in the early 1930's, the requirement became more severe. The bandwidth was increased from 10 kilocycles to approximately 150 kilocycles which required that the pass characteristics of the intermediate frequency amplifier be properly tailored and properly shaped to accommodate the wider frequency modulation spectrum. With the use of television transmission in modern communications era, the bandwidth for a typical transmission system involving both signal and image involves a total bandwidth of approximately 6 megacycles. Since the higher frequency component in a television signal involves components having frequencies of several megacycles, it is not possible to use the double sideband type of transmission; therefore a system involving a single sideband or vestigial sideband transmission of the television image was devised. This signal also includes sound information on a frequency modulated carrier whose mean frequency is four and one-half megacycles from the carrier frequency. With the advent of commerical television broadcasting, the assignment of channels to the many television stations involved correct utilization of the spectrum band for the transmission of television signals. Because each channel is allotted 6 megacycles, in the very high frequency signal region extending from approximately 50 megacycles to 212 megacycles, it was found necessary to space the channels having a bandwidth of 6 megacycles each in such a way that a very small guardband was present between each of the channels. This introduced new problems into the design of the television receivers since it was necessary to not only design for optimum transmission and utilization of the television signal but also to insure against interference from adjacent channels and also to eliminate to a great degree the co-channel interference from carriers and subcarriers existing in the television signal. In addition, because of the use of the single sideband or vestigial sideband technique in signal transmission, it was also found necessary to attenuate the carrier level and the frequency regions around the carrier so that undue bass response and distortion would not be introduced into the recovered television signal.

In monochrome television receivers, the problem of accommodating wide band signals was substantially met by intermediate frequency amplifiers having somewhat reduced design demands because it has been found in practice that a signal having substantially smaller bandwidth than the full 6 megacycles has yielded a satisfactory monochrome television image. This problem, however, is not the case in the transmission of color television signals. Color television signals utilize fully the 6 megacycle band assigned. In addition to the usual brightness information and the sound channel, the color information is transmitted on a suppressed carrier 3.58 megacycle color subcarrier. This color information consists of two signals known as I and Q signals. The 3.58 megacycle color subcarrier is modulated by these two color signals. The bandwidth of the I and Q signals is such that the sidebands of the subcarrier extend up to over 4.2 megacycles from the picture carrier. Any distortion in the upper edge of the band will therefore result in a loss of color fidelity.

Accordingly, in the present invention, there is provided apparatus for more readily achieving the shape of the pass band of the intermediate frequency amplifier necessary for faithful color reproduction and monochrome reproduction while providing adequate sound rejection and for minimizing the co-channel and adjacent channel interference. These desirable results are achieved by a unique and novel apparatus for signal cancellation in circuits involving multi-control grid electron tubes in the intermediate frequency amplifier.

It is therefore an object of this invention to shape the bandpass characteristics of a bandpass amplifier.

It is yet another object of this invention to provide a means for shaping the bandpass response characteristics of an intermediate frequency amplifier.

It is still another object of this invention to provide a means for cancellation of a range of frequencies in the band pass response characteristics of an intermediate frequency amplifier.

It is still another object of this invention to provide a means for frequency cancellation in a transmission network.

It is yet a further object of this invention to provide a band elimination means for use in conjunction with an amplifier network.

It is yet another object of this invention to provide a means for minimizing co-channel interference in a television receiver.

It is still a further object of this invention to provide a means for minimizing adjacent channel interference in a television receiver intermediate frequency amplifier.

According to the invention a multi-grid electron tube is utilized in a way whereby the signal appearing at one screen grid is developed across a resonant circuit and applied to another control grid in such a way that cancellation of the signal in electrons arriving at the anode and having the frequency of the resonant circuit is obtained.

In one form of the invention a pentagrid tube is used with a wide band singly tuned circuit in its plate circuit and a sharply tuned low impedance tank in the screen grid circuit. The voltage developed across this sharply tuned tank is coupled to the second control grid. This voltage modifies the current going to the plate and screen in such a way as to reduce the A. C. current to the plate at the frequency of the sharply tuned tank.

Any and all objects of this invention will become apparent upon a reading of the following specifications and an inspection of the drawings in which:

Figure 1 shows a basic signal cancellation circuit embodying the present invention;

Figure 2 shows the voltages on the respective electrodes of the pentagrid tube in Figure 1 at cancellation frequency;

Figure 3 shows the voltages on the various electrodes of the tube in Figure 1 within the pass band;

Figure 4:
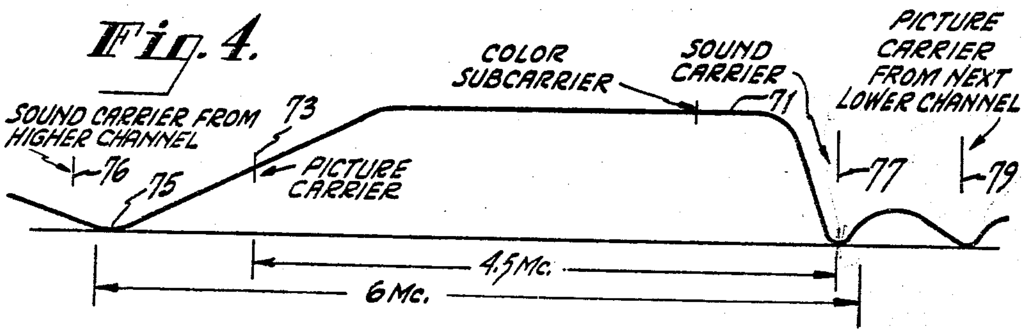
Figure 4 shows a typical I. F. response characteristic which is used in television receivers including provisions for adjacent channel interference elimination; and, Figure 5 shows the present invention embodied in a television intermediate frequency amplifier.

Consider first the operation of the present invention as included with the pentagrid converter tube 11 shown in Figure 1. Here there is connected the wide band tuned circuit 13 to the anode 15. The screen grids 17 and 19 are tied together and utilized to drive the high Q, low impedance tank 21 which in turn is coupled to the second control grid 23. The A. C. input signal is applied to the control grid 25. The voltage developed across the high Q low impedance tank 21 is coupled as indicated to the second control grid 23 utilizing the tap 27 on the inductance 29 so that the tank will present a low impedance. The voltage appearing at the second control grid 23 modifies the current going to the plate 15 and the screen grids 19 and 17 in such a way as to reduce the A. C. current to the plate 15 at the frequency of the high Q low impedance tank 21. The second control grid voltage is adjusted to cancel the effect of the voltage on the first control grid 25 for the frequency of the sharply tuned tank.

The gain of the tube is unaltered within the pass band. The frequency difference between the frequency of cancellation and the frequency of negligible attenuation is considerably less than may be obtained with absorption type traps.

Within the pass band as determined by the plate tuned circuit 13, the plate develops an output signal proportional to the impedance of the plate tuned circuit 13. The screen grids 17 and 19 develop no output signal since the high Q low impedance tank 21 is off resonance and is of low impedance in the pass band as associated with the tuned plate circuit 13. No signal is therefore applied to the second control grid 23 and the gain of the pentagrid amplifier 11 is at full value.

At cancellation frequency, the high Q low impedance tank circuit 21 develops a signal comparable to that applied to the first control grid 25 but in opposite phase. This signal, as has been mentioned, is applied to the second control grid 23. This signal causes the A. C. plate component of plate current to be reduced and the A. C. component of screen grid component to be increased. When the screen grid gain is adjusted properly by placement of the tape 27 on the high Q, low impedance tank circuit 21, all of the A. C. voltage is returned to the screen grids 17 and 19 and no A. C. component appears at the anode 15 and therefore no A. C. voltage is developed across the tuned plate circuit 13.

Figure 2 shows the operation of the pentagrid converter 11. At cancellation frequency, the sine wave 51 is applied to the control grid 25. This sine voltage 51 then develops the screen grid voltage 53 which is in turn caused to produce the second control grid voltage 55 due to the action of the high Q low impedance tank circuit 21. Cancellation thereby takes place leading to the constant plate voltage 57.

Figure 3 shows the wave form 51 which is impressed on the first control grid 25. When the frequency of the wave form is within the pass band, the screen grid voltage 59 is constant, thereby leading to a constant second control grid voltage 61. Cancellation does not take place and the impressed signal 51 is amplified within the pentagrid converter 11 and is caused to produce the plate voltage 63.

There are many applications for the teachings involved in the present invention which apply to many types of circuits used in the communication art. One of the most promising applications of the present invention is that concerned with intermediate frequency amplifiers in television receivers.

Figure 4 shows a typical I. F. response characteristic 71 which is utilized in many types of television receivers. This response characteristic 71 involves the transmission of a vestigial wide band television signal wherein the picture carrier frequency 73 is placed at half power with trapping provided at the frequency 75 in order to trap the sound carrier from a higher channel, at the sound carrier 77 which must be reduced in amplitude to avoid cross modulation between the sound information and the video information and at the picture carrier 79 from the next lower channel. It follows then from Figure 4 that the signals at the frequencies indicated by the designators 75, 77 and 79 and relating to the higher channel sound carrier, the co-channel sound carrier and the picture carrier from the next lower channel must be adequately trapped or attenuated relative to the signal level of the transmission band for the video frequencies.

Figure 5:
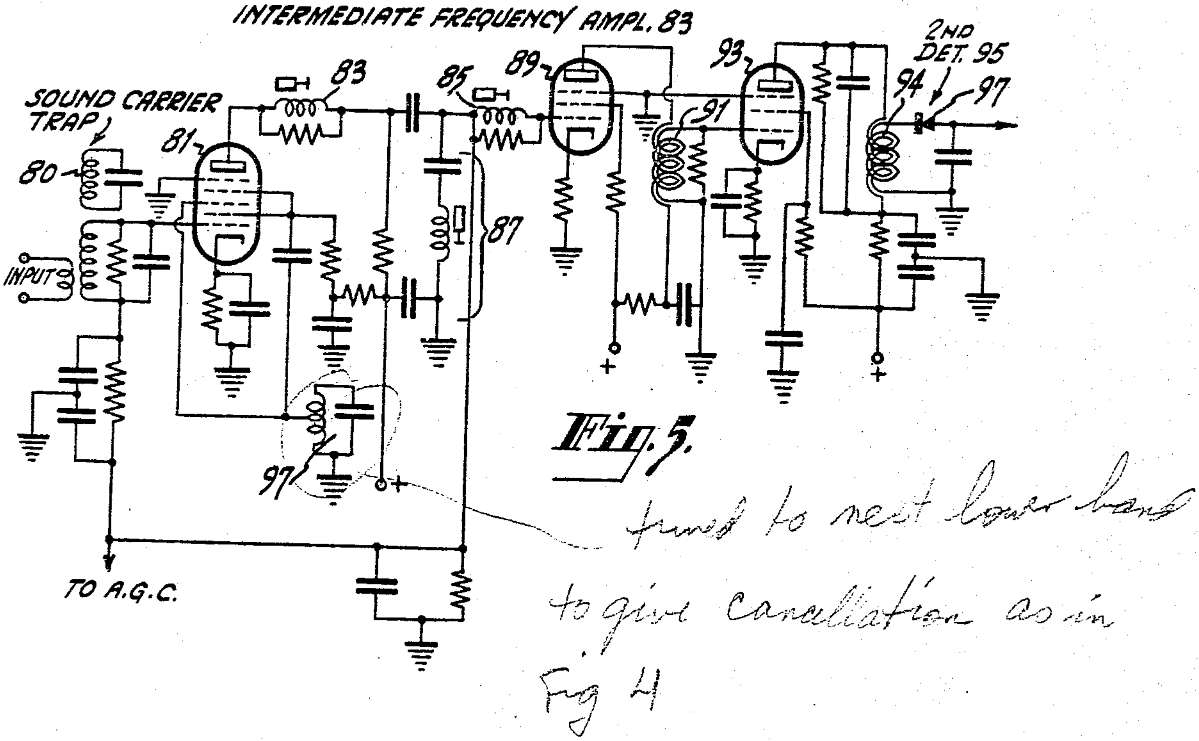

Figure 5 shows one means of achieving, for example, the trapping relating to the picture carrier 79 from the next lower channel. Here a pentagrid converter tube 81 is utilized in the first stage of an intermediate frequency amplifier 83. This intermediate frequency amplifier is described in detail in the copending application 38,719, entitled "Color Television Receiver" by E. O. Keizer and L. L. Burns, Jr. This circuit is an intermediate frequency amplifier circuit involving the well known principles of stagger tuning for achieving an I. F. response of the type shown in Figure 4. It involves the use of the resonant circuit 83 which forms the plate load for the pentagrid converter tube 81, the resonant circuit 85 which forms the grid load for the second I. F. amplifier tube 89 and the series resonant circuit 87. The resonant circuit 91 forms the resonant load for the second I. F. tube 89; the output of the resonant load 91 is then used to drive the third amplifier 93 whose output load includes the resonant circuit 94. The output of the resonant circuit 94 is then applied to the second detector circuit 95 which involves the use of the crystal detector 99.

The resonant circuit 97 which is tuned to the picture carrier frequency 79 from the next lower channel and which is coupled to the third grid of the pentagrid converter tube 81, will then cause signal cancellation at this frequency thereby leading to the dip indicated in the I. F. response characteristic 71 shown in Figure 4. The operation of the pentagrid converter tube 81 utilizing the resonant circuit 97 follows from the teachings described in connection with Figure 1. By proper tuning of the resonant circuits 83, 85, 87, 91 and 94, an I. F. response characteristic, substantially that as shown as the I. F. response characteristic 71 in Figure 4, may be achieved.

The present invention as employed in the circuit shown in Figure 5 has been utilized to eliminate picture carrier interference from the next lower channel. It has been described in a way so as to emphasize and illustrate its usefulness; it follows that should sound carrier 77 attenuation and adjacent channel sound carrier attenuation corresponding to the higher sound carrier 76 be required, then the present invention can be utilized for this additional trapping and attenuation by using pentagrid converter tubes or tubes of similar construction in place of the second I. F. tube 89 and the third I. F. tube 93 and by employing screen grid and second control-grid cancellation circuits of the type which have been taught by the present invention.

The preceding discussion has been in terms of the application of the present invention for adjacent and co-channel trapping. It follows to one skilled in the art that the present invention is also highly suitable for shaping the band pass characteristics of one or more of the stages of a stagger tuned band pass amplifier.

Having described the invention, what is claimed is:

1. In a signalling system provided with a source of signals, the combination comprising an electron discharge device including a cathode, a first control grid, a second control grid, a screen grid, and an anode, means for coupling said signal source between said first control grid and said cathode, an output circuit coupled between said anode and said cathode, means for applying a positive bias to said screen grid, means for bypassing said screen grid for desired signal components having frequencies falling in a first predetermined band, said bypassing means comprising a bypass network coupled between said screen grid and a point of reference potential, said bypass network presenting a relatively low impedance at frequencies within said first band, frequency selective means included in said bypass network for causing said bypass network to present a relatively high impedance at frequencies of undesired signal components falling in a second predetermined band whereby a phase inverted replica of signal components appearing at said first control grid and having frequencies falling within said second predetermined band is developed in said screen grid bypass network, and means for applying the phase inverted replica of such signal components developed in said network to said second control grid.

2. A combination in accordance with claim 1 wherein said frequency selective means comprises a relatively high Q tank circuit tuned to a frequency within said second predetermined band, said tank circuit including an inductance element, and wherein said second control grid is connected to a tapping point on said inductance element chosen such that the amplitude of the phase inverted replica of the undesired signal components applied to said second control grid is appropriate to substantial cancellation of the effect in said output circuit of the appearance of said undesired signal components at said first control grid.

3. In a bandpass amplifier, the combination comprising an amplifying device including a cathode for generating a stream of electrons, a control grid for modulating said stream of electrons in accordance with input signals, and an anode for receiving the modulated stream of electrons, a bandpass network coupled between said anode and said cathode, said amplifying device being also provided with an additional electron receiving electrode, a parallel resonant circuit tuned to a predetermined rejection frequency, means for coupling said resonant circuit between said additional electrode and a point of reference potential, said amplifying device being additionally provided with a second control grid for modulating the stream of electrons, and means for connecting said second control grid to said resonant circuit.

4. In a television receiver, an intermediate frequency amplifier comprising an electron tube including a cathode, a first control grid, a screen grid, a second control grid, and an anode, means for applying intermediate frequency television signals between said first control grid and said cathode, a first parallel resonant circuit tuned to a frequency within a desired television intermediate frequency passband effectively coupled between said anode and said cathode, a second parallel resonant circuit tuned to a frequency of an interfering signal outside said desired television intermediate frequency passband effectively coupled between said screen grid and said cathode, and means for connecting said second control grid to said second resonant circuit.

5. An intermediate frequency amplifier in accordance with claim 4 wherein the connection of said second control grid to said resonant circuit is to a point in said resonant circuit of an impedance level at said interfering signal frequency appropriate to substantial elimination of the effect in said anode-cathode resonant circuit of any application of the interfering signal between said first control grid and said cathode.

6. In a television receiver including means for converting received signals to intermediate frequencies, an I. F. amplifier comprising an electron discharge device including a cathode, a pair of control grids, a screen grid, and an anode, means for applying said received signals at intermediate frequencies to one of said pair of control grids, a tuned output circuit coupled between said anode and said cathode, means for applying positive operating potential to both said anode and said screen grid, a relatively high Q tank circuit tuned to an interfering signal intermediate frequency, a bypass capacitor, means for connecting one end of said tank circuit to a point of reference potential, said tank circuit including an inductance element having an intermediate tapping point, means for connecting said bypass capacitor between said screen grid and said intermediate tapping point, and means for connecting the other of said pair of control grids to said intermediate tapping point.

References Cited in the file of this patent

UNITED STATES PATENTS

| | | |
|---|---|---|
| 2,313,911 | Bach | Mar. 16, 1943 |
| 2,423,285 | Badmaieff | July 1, 1947 |
| 2,549,825 | Labin | Apr. 24, 1951 |
| 2,619,536 | Cotsworth et al. | Nov. 25, 1952 |
| 2,717,359 | Wild | Sept. 6, 1955 |

FOREIGN PATENTS

| | | |
|---|---|---|
| 561,160 | Great Britain | May 8, 1944 |